United States Patent
Yokota

(10) Patent No.: US 6,525,813 B2
(45) Date of Patent: Feb. 25, 2003

(54) SPECTROPHOTOMETER

(75) Inventor: Kazumi Yokota, Osaka (JP)

(73) Assignee: Shimadzu Corporation, Kyoto (JP)

( * ) Notice: Subject to any disclaimer, the term of this patent is extended or adjusted under 35 U.S.C. 154(b) by 274 days.

(21) Appl. No.: 09/752,733

(22) Filed: Jan. 3, 2001

(65) Prior Publication Data

US 2001/0050770 A1 Dec. 13, 2001

(30) Foreign Application Priority Data

Jun. 13, 2000 (JP) ........................................ 2000-176480

(51) Int. Cl.$^7$ ................................................. G01J 3/42

(52) U.S. Cl. ........................................ 356/325; 356/51

(58) Field of Search ................................. 356/323, 324, 356/325, 314, 51; 250/339.07

(56) References Cited

U.S. PATENT DOCUMENTS 3,927,944 A * 12/1975 Iwahashi et al. ............ 356/325

* cited by examiner

Primary Examiner—F. L. Evans
(74) Attorney, Agent, or Firm—Kanesaka & Takeuchi

(57) ABSTRACT

In a spectrophotometer, light emitted from a light source is processed to provide monochromatic light by a monochromator, and reaches a sector mirror having a chopper function. The sector mirror is rotated by a motor, and a rotational frequency of the motor can be controlled by a controller. By rotation of the sector mirror, monochromatic light is alternately distributed to a sample cell and a reference cell through a mirror. In measuring a wavelength range where a detector having a photomultiplier with a fast response speed is used, the motor is rotated at a high speed, so that time for scanning a wavelength is shortened. In measuring a wavelength range where a detector having lead sulfide with a slow response speed is used, the motor is rotated at a low speed to obtain a sufficiently strong signal intensity. Accordingly, in the spectrophotometer, the analysis time can be shortened, and the sufficiently strong signal can be outputted at the same time.

5 Claims, 5 Drawing Sheets

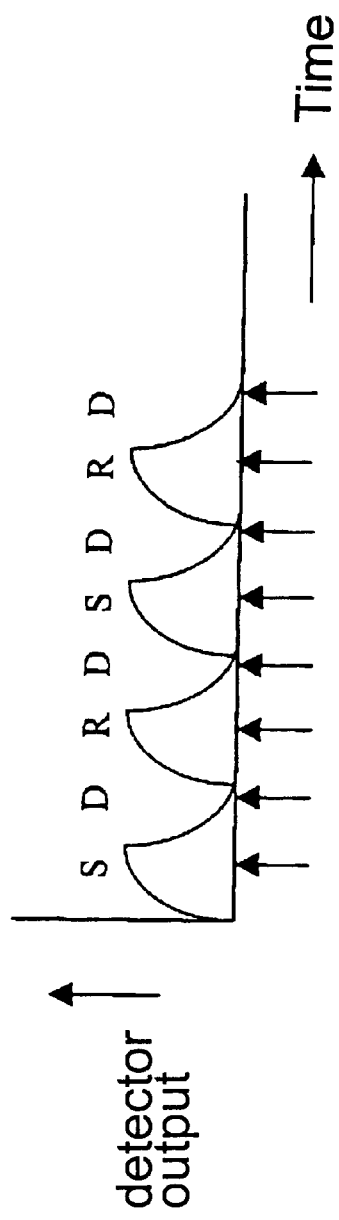
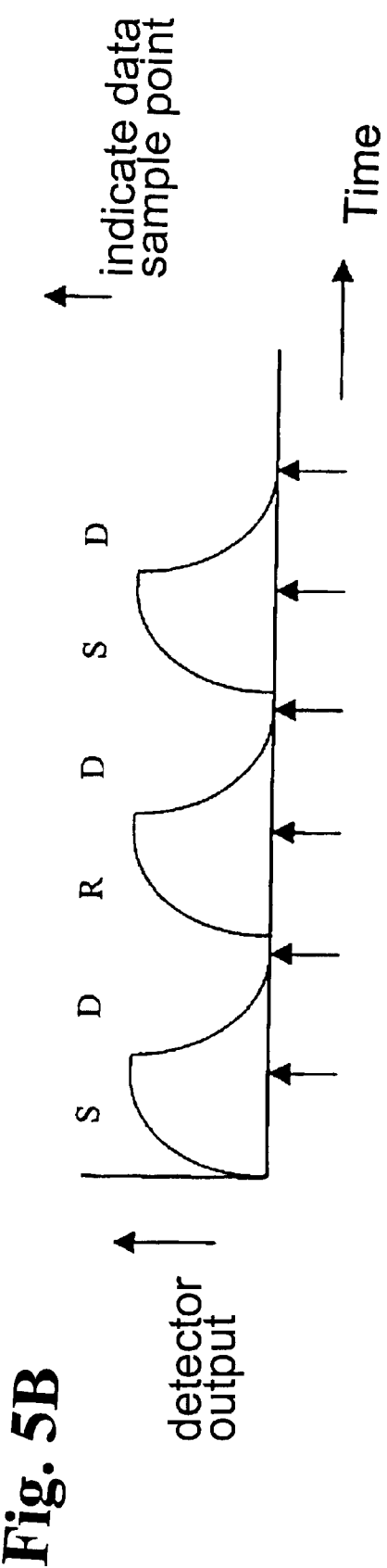
Fig. 5A
Fig. 5B

SPECTROPHOTOMETER

BACKGROUND OF THE INVENTION AND RELATED ART STATEMENT

The present invention relates to a spectrophotometer of a double beam system used for a general purpose.

A spectrophotometer measures a spectrum of light transmitted through a sample to be measured, and examines a wavelength of light absorbed by the sample or a wavelength of the transmitted light, to thereby analyze components of the sample.

Among the conventional spectrophotometers, there is a spectrophotometer with a double-beam system which carries out qualitative and quantitative analyses by measuring a ratio of an energy of light passing through a measured sample relative to an energy of light passing through a reference sample. In this case, light has to be irradiated to two optical paths. Normally, after light from a single light source is processed to have monochromatic light by a monochromator, the monochromatic light is divided into two optical paths, that is, signal light irradiated to the sample and reference light irradiated to a reference sample (double beam). Also, a detector which converts light energy into electric signals is used, but elements of the detector have to repeatedly measure an energy at a time of illuminating light and dark signal at a time of non-illumination of light so as to detect the energy conversion of the measured light. In order to repeatedly switch between the signal light and the reference light, and illumination and non-illumination of lights, a sector mirror (chopper) rotatable at a fixed rotational frequency is used. In order to eliminate an effect of a power supply frequency, in other words, an effect of a hum, the rotational frequency of the sector mirror is synchronized with the power supply frequency by utilizing a synchronous motor.

FIG. 2 shows a schematic structural view of a sector mirror. In a sector mirror 21, opening sections 22 and 23, mirrors 24 and 25, and shielding sections 26, 27, 28 and 29 are alternately arranged. The sector mirror 21 is disposed such that the opening sections 22 and 23 or the mirrors 24 and 25 are located in the optical path, and the sector mirror 21 is rotated at a fixed speed by a motor or the like. FIG. 3 shows a schematic structural view of a spectrophotometer of a double beam system. Light from a light source 31 is processed to provide monochromatic light by a monochromator 32, and then reaches the sector mirror 21. The sector mirror 21 is disposed at an angle of 45 degrees with respect to the optical path such that the opening sections 22 and 23 or the mirrors 24 and 25 are located in the optical path, and the sector mirror 21 is rotated at a fixed speed by a motor 34. By rotating the sector mirror 21, when the opening section 22 is located in the optical path, the light from the light source passes through the sector mirror 21, and after the light is transmitted through a sample 36, the light is reflected by a mirror 39 to be detected by a detector 42.

Next, when the sector mirror 21 is rotated, the shielding section 26 intercepts the light from the monochromator 32, so that the light does not reach the detector 42, resulting in that the detector 42 detects a dark signal. Thus, the sector mirror 21 also has a chopper function. By rotating the sector mirror 21 furthermore, the mirror 24 is disposed in the optical path, so that the light from the monochromator 32 is reflected by the mirror 24. Further, after the light is reflected by a mirror 38, the light is transmitted through a standard sample 37, and then the light is reflected by a mirror 40, to thereby be detected by the detector 42.

Also, by further rotating the sector mirror 21, the shielding section 27, the opening section 23, the shielding section 28, the mirror 25 and the shielding section 29 are located in the optical path in turn, so that the intensity or strength of the light transmitted through the sample 36, and the intensity or strength of the light transmitted through the standard sample 37 are repeatedly measured by the detector 42.

In the spectrophotometer, especially in a high-grade spectrophotometer, a spectroscopic analysis is carried out in a wide wavelength range which extends from an ultraviolet region to an infrared region, and if the wavelength range is widened, it is difficult to detect the entire wavelengths by a single detector. For example, in case the measurement is carried out in a range from a wavelength of 190 nm to a wavelength of 3200 nm, there are used two kinds of the detectors using PMT (photomultiplier) and PbS (lead sulfide). In general, these two kinds of detectors are switched over around the wavelength of 850 nm, so that the detector using PMT operates in the wavelength range from 190 nm to 850 nm, and the detector using PbS operates in the wavelength range from 850 nm to 3200 nm.

In case two kinds of the detectors using PMT and PbS, are used, their responses are extremely different (for order of several digits). Especially, in case the detector using PbS is cooled to increase the detection sensitivity, a response speed thereof becomes extremely slow. As the speed of rotating the sector mirror becomes faster, time required for scanning the wavelength in a necessary range can be shorter, so that a short time analysis is available. However, in the detector which is slow in the response, it is impossible to output a sufficient signal by increasing the speed of the rotation of the sector mirror. Therefore, in the conventional spectrophotometer, the rotational frequency of the sector mirror is set at the speed which does not cause the problem in the response speed of the detector, and accordingly, a wavelength scanning speed is determined.

Since the rotational frequency of the sector mirror is fixed at the constant value, in case the two kinds of the detectors are used, the rotational frequency of the sector mirror is determined based on the detector which is slow in the response speed, and it is inevitable for the analysis time to become long. In the spectrophotometer which measures the wide wavelength range from the ultraviolet region to the infrared region, 1800 rpm, which is synchronous with the power supply frequency, is generally adopted as the rotational frequency of the sector mirror.

The present invention has been made to solve the aforementioned problems, and an object of the invention is to provide a spectrophotometer, which includes two kinds of detectors in order to analyze a wide wavelength range and outputs sufficiently large signals while the analysis time can be shortened.

Further objects and advantages of the invention will be apparent from the following description of the invention.

SUMMARY OF THE INVENTION

To achieve the aforementioned object, the present invention provides a spectrophotometer, in which a rotational frequency of a motor for rotating a sector mirror can be controlled externally. In the spectrophotometer of the invention, when a detector which is fast in a response speed is operated, the rotational frequency of the sector mirror is increased, to thereby shorten time for scanning the wavelength. When a detector which is slow in a response speed is operated, the rotational frequency of the sector mirror is decreased, so as to obtain a sufficiently large output signal.

As described above, by controlling the rotational frequency of the sector mirror in accordance with the response speed of the detector, there can be obtained the spectrophotometer in which the analysis time is short and the output signal is sufficiently large.

BRIEF DESCRIPTION OF THE DRAWINGS

FIGS. 5A and 5B are diagrams showing relationships between time and output signals by the detector of the embodiment of the invention.

DETAILED DESCRIPTION OF PREFERRED EMBODIMENTS

Figure 1:
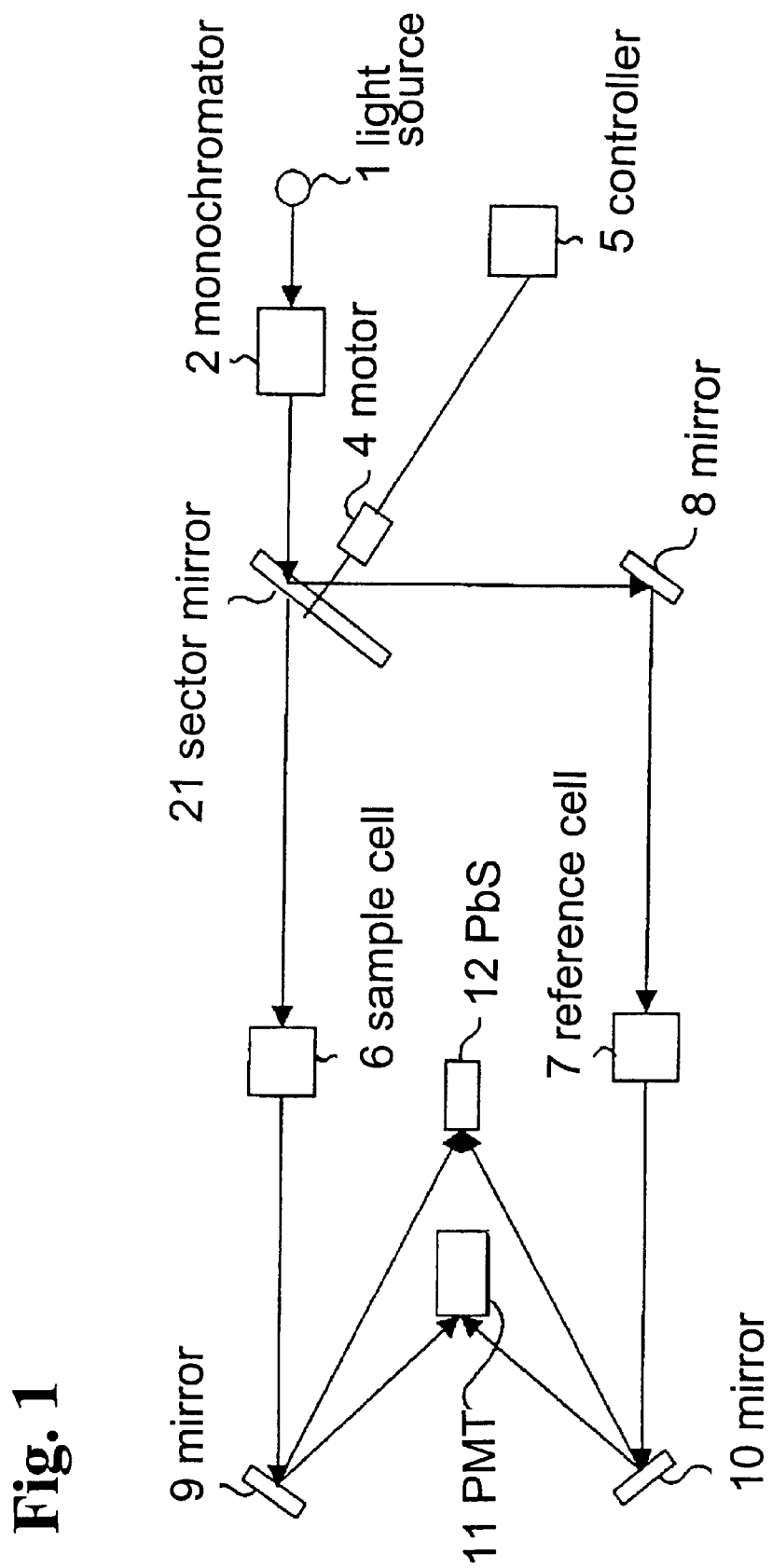
FIG. 1 is a schematic structural view of an embodiment of a spectrophotometer according to the present invention.

Hereunder, embodiments of the invention will be explained with reference to the attached drawings. FIG. 1 is a schematic structural view of an embodiment of a spectrophotometer according to the present invention. An apparatus of the invention is formed of a light source 1; a monochromator 2; a sector mirror 21; a motor 4 for rotating the sector mirror 21; a controller 5 for controlling a rotational frequency of the motor 4; a sample cell 6 in which a sample is introduced; a reference cell 7 in which a standard sample is introduced; mirrors 8, 9 and 10; and a detector 11 using PMT (photomultiplier) and a detector 12 using PbS (lead sulfide).

Figure 2:
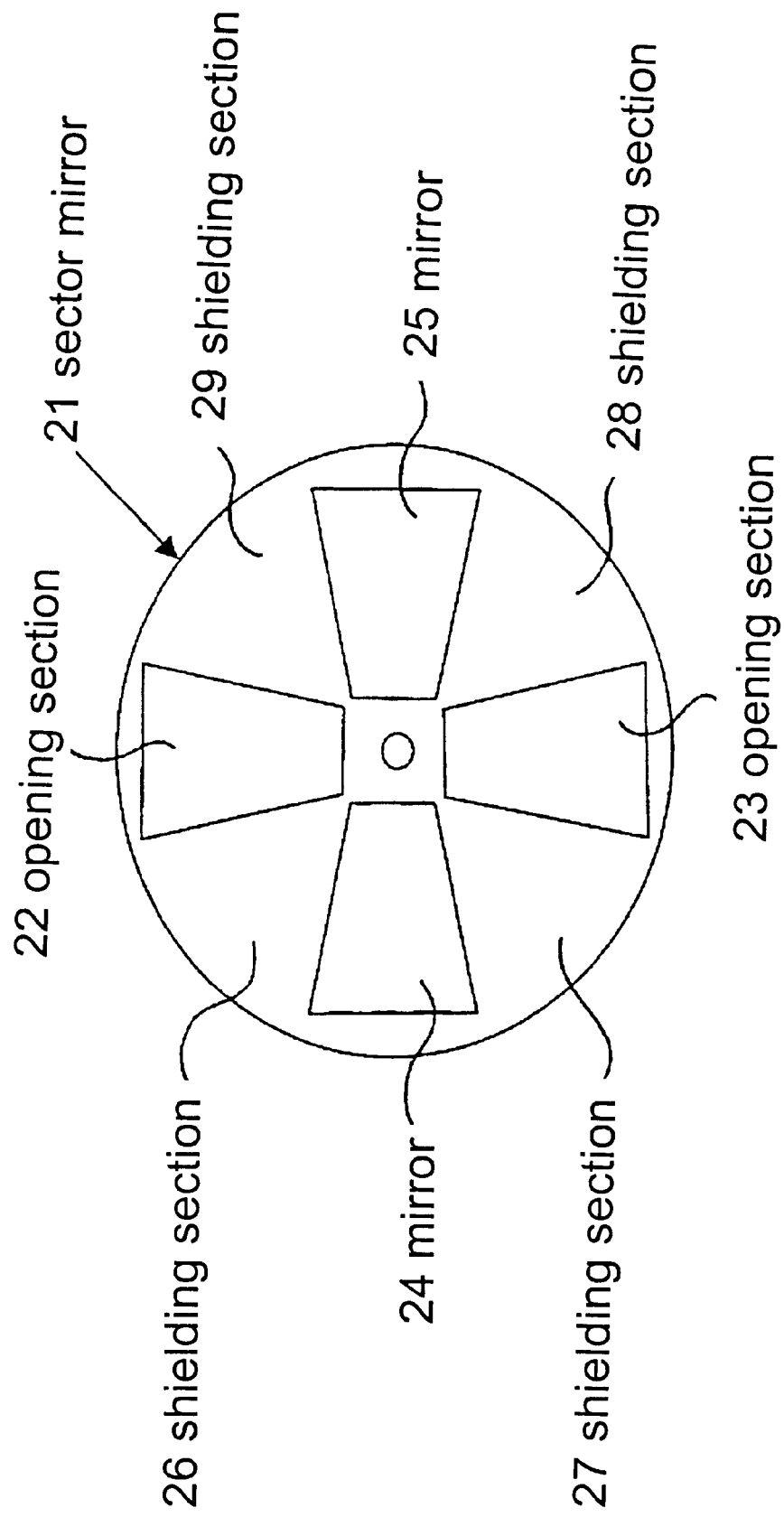
FIG. 2 is a schematic structural view of a sector mirror used in the conventional and present spectrophotometers.
Figure 3:
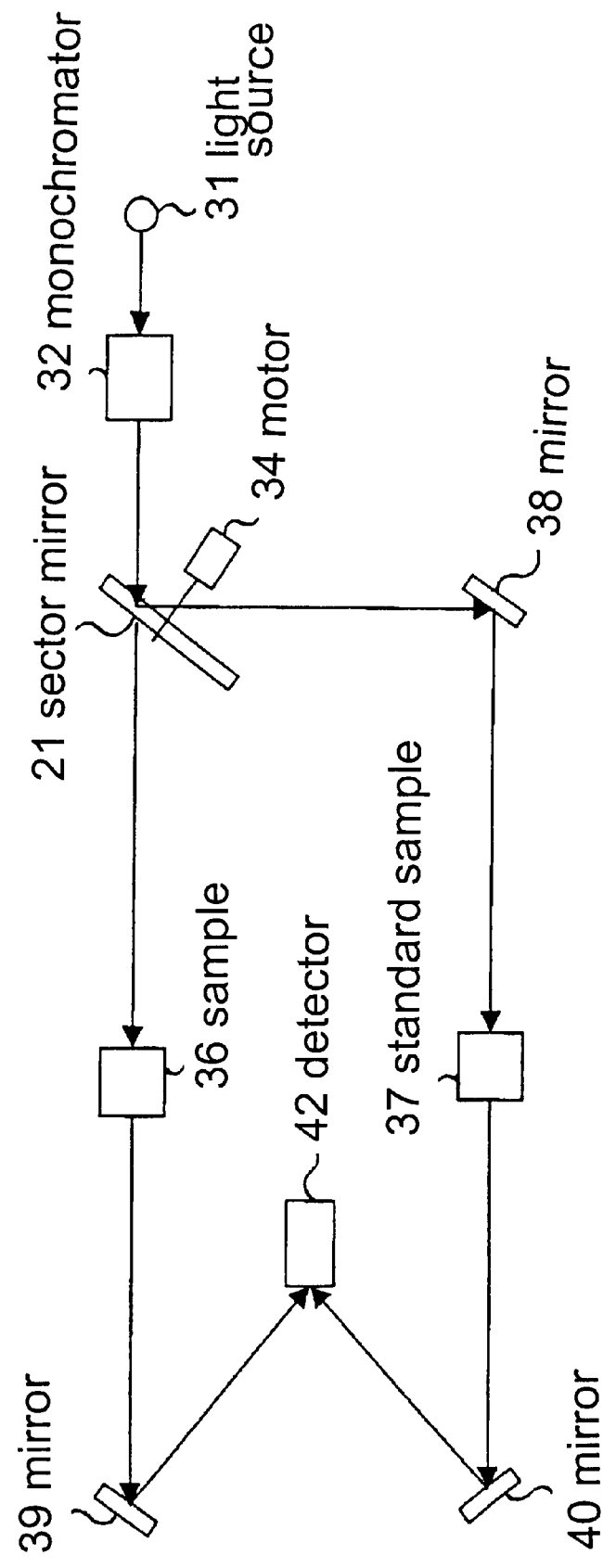
FIG. 3 is a schematic structural view of the conventional spectrophotometer.

Light irradiated from the light source 1 is processed to have monochromatic light by the monochromator 2, and reaches the rotatable sector mirror 21. The sector mirror 21 has the same structure as that shown in FIG. 2, and also functions as a chopper. The sector mirror 21 is rotated by the motor 4. The motor 4 is a brushless DC servomotor, and a rotational frequency thereof can be controlled by the controller 5. The monochromatic light from the monochromator 2 is alternately sent to the sample cell 6 and the reference cell 7 through the mirror 8 by the rotation of the sector mirror 21, and at the same time, the light is intercepted to measure dark.

Namely, by rotating the sector mirror 21, when the opening section 22 is located in the optical path, the light from the light source 1 passes through the sector mirror 21 to reach the sample cell 6. Next, by rotating the sector mirror 21, the shielding section 26 intercepts the light from the monochromator 2, so that the sector mirror 21 also has a chopper function. By further rotating the sector mirror 21, the mirror 24 is disposed in the optical path, and the light from the monochromator 2 is reflected by the mirror 24 and further reflected by the mirror 8 to reach the reference cell 7. The lights which respectively pass through the sample cell 6 and the reference cell 7 are guided to the detector 11 using PMT or the detector 12 using PbS by the mirrors 9 and 10, so that the light energies are measured. The motor 4 is rotated by a driving signal from the controller 5. Also, the signal corresponding to the rotation of the motor 4 or the sector mirror 21 can be taken out as a rotational frequency detection signal. The motor 4 is controlled by the controller 5, such as a CPU, and the rotational frequency detection signal is utilized in this case. Accordingly, the motor 4 can be driven at the desired chopper frequency.

Figure 4:
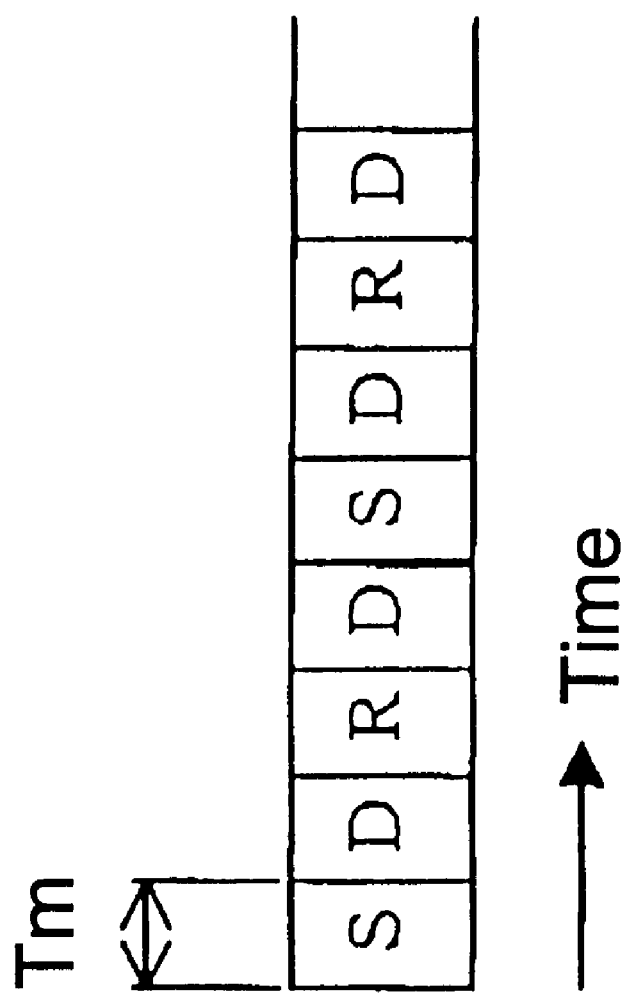
FIG. 4 is a diagram showing a schedule of signals observed by detectors in the spectrophotometer of the invention.

FIG. 4 shows a schedule of signals observed by the detector 11 using PMT or the detector 12 using PbS. A horizontal axis in the figure indicates time, and Tm designates a period of time determined by the rotational frequency of the motor 4. S indicates that light transmitted through the sample cell 6 is observed, R indicates that light transmitted through the reference cell 7 is observed, and D indicates that the dark is observed. Although it is not necessary that the periods S, R, D of time are the same, these periods of time are normally set to be the same. In the periods of S and R, the detector detects relatively strong light, and light is not detected in the period of D. Thus, light is irradiated into the detector like a step-input.

Light from the light source 1 is scanned by the monochromator 2 in a range from the wavelength of 190 nm to the wavelength of 3200 nm. While light is scanned in the wavelength range of 190 nm to 850 nm, the light transmitted through the sample cell 6 and the reference cell 7 is reflected by the mirrors 9 and 10, and detected by the detector 11 using PMT. Since the response speed of the detector 11 using PMT is fast, even though the rotational frequency of the motor 4 is set at 3600 rpm, which is twice faster than the conventional one, by the controller 5, a sufficiently large signal can be obtained. Accordingly, time required for the wavelength scanning can be shortened to half for the conventional one, so that the analysis time can be shortened to half with respect to the conventional one.

While light is scanned by the monochromator 2 in a range from the wavelength of 850 nm to the wavelength of 3200 nm, light transmitted through the sample cell 6 and the reference cell 7 are reflected by the mirrors 9 and 10, and detected by the detector 12 using PbS. FIGS. 5A and 5B show relationships between the output signals by the detector 12 using PbS and time. S, D and R in FIGS. 5A and 5B indicate the schedule of the signals shown in FIG. 4. FIG. 5A shows a case that the rotational frequency of the sector mirror 21 is set at 3600 rpm, which is twice faster than the conventional one. In this case, the chopper frequency is high, and the signals do not reach the maximum at data sample points shown by arrows in the figure, so that the detector does not respond sufficiently. FIG. 5B shows a case that the rotational frequency of the sector mirror 21 is set at 1800 rpm, which is the same as the conventional one, and in this case, the signals reach the maximum at data sample points shown by arrows in the figure, so that the detector responds sufficiently. As described above, since the rotational frequency of the sector mirror 21 can be controlled by the controller 5 in accordance with the response speed of the detector, the sufficiently large signal can be obtained, and the analysis time can be set to the shortest.

In order to increase the detection sensitivity of the detector 12 using PbS, it is necessary to cool the entire elements of the detector 12 using PbS. However, by cooling the elements, the response speed thereof becomes slow. Depending on the sample, there is a case which requires the highly sensitive detection. In this case, the detector 12 using PbS is cooled, and by decreasing the rotational frequency of the motor 4, the apparatus can be easily adapted to this case.

Also, when the motor 4 is subjected to carry out a rotation like a reciprocating motion or the sector mirror 21 is stopped such that the opening section 21 and the shielding section 26 or the shielding section 29 in the sector mirror 21 are alternately located in the optical path extending from the monochromator 2 to the sample cell 6, the spectrophotometer of the invention can be used as a spectrophotometer of a single beam system.

Although the embodiment of the invention has been explained above, the present invention is not limited to the aforementioned embodiment, and various modifications can be made within the gist of the present invention. For example, although the mirrors 24 and 25 which are provided for switching light between the sample cell 6 and the reference cell 7, and the shielding sections 26, 27, 28 and 29 for the chopper function which intercept the luminous flux in order to measure the dark signal, are integrally formed in the sector mirror 21 in the aforementioned embodiment, a chopper mechanism can be separately formed, and the mirrors and the chopper are synchronously operated, so that the system as in the aforementioned embodiment can be achieved. For example, the chopper can be disposed at a position much closer to the light source, and the mirror can be disposed at the position close to the sample as in the embodiment. Also, the mechanism and means for measuring the dark signal are not limited to the one in the embodiment.

Although the motor 4 and the sector mirror 21 are directly connected in the aforementioned embodiment, the rotation of the motor 4 can be connected through a some kind of a transmission mechanism to the sector mirror 21. Further, although the brushless DC motor is used as the motor 4 which is capable of controlling the rotational frequency in the embodiment, the motor is not limited to the above, and any motor can be used as long as the motor can freely set and control the rotational frequency. Also, strictly for the purpose of synchronizing with the power supply frequency, the synchronous motor as in the conventional spectrophotometer can be used, and the rotational frequency can be discretely changed by a clutch or the like.

According to the present invention, since the rotational frequency of the sector mirror having a chopper function can be freely set and controlled in accordance with the response speed of the detector, measuring time can be shortened to the minimum while a sufficiently strong signal intensity is obtained. Also, in case the detector is required to be cooled in order to increase the sensitivity of the detector, the response speed is decreased at the same time, but in such a situation, the spectrophotometer can be adapted easily. Furthermore, the spectrophotometer of the invention can be used as a single beam system spectrophotometer.

While the invention has been explained with reference to the specific embodiments of the invention, the explanation is illustrative and the invention is limited only by the appended claims.

What is claimed is:

1. A spectrophotometer comprising:

a light source, a sample section for receiving a sample to be measured, an optical path between the light source and the sample section, a sector mirror section located in the optical path and having a mirror, an opening portion and a shielding portion, said sector mirror section being operated so that one of the mirror, the opening section and the shielding section is located in the optical path, and controlling means connected to the sector mirror section for controlling a frequency of change of the sector mirror section.

2. A spectrophotometer according to claim 1, further comprising first and second detectors for receiving light passing through the sample section, said first detector having a response speed faster than that of the second detector, said controlling means increasing the frequency of change of the sector mirror section when the first detector is used, and decreasing the frequency of change of the sector mirror section when the second detector is used.

3. A spectrophotometer according to claim 2, wherein said light source provides the light from an ultraviolet region to an infrared region.

4. A spectrophotometer according to claim 3, further comprising a reference section for receiving a reference material, said sector mirror section providing the light from the light source to the sample section and the reference section alternately.

5. A spectrophotometer according to claim 4, wherein said sector mirror section includes a sector mirror having said mirror, opening portion and shielding portion arranged circularly, and a motor connected to the sector mirror for rotating the same, said motor being connected to the controlling means for controlling a rotational frequency of the motor to thereby control the frequency of change of the sector mirror.

* * * * *